United States Patent
Fournier et al.

(10) Patent No.: US 9,902,310 B2
(45) Date of Patent: Feb. 27, 2018

(54) SYSTEM AND METHOD FOR IDENTIFICATION OF TRANSPORT VEHICLES AND DRIVERS

(71) Applicant: Opus Inspection, Inc., East Granby, CT (US)

(72) Inventors: Thomas J. Fournier, Tucson, AZ (US); Lothar Geilen, Key Biscayne, FL (US); Brian J. Herron, Dexter, MI (US)

(73) Assignee: Opus Inspection, Inc., East Granby, CT (US)

( * ) Notice: Subject to any disclaimer, the term of this patent is extended or adjusted under 35 U.S.C. 154(b) by 0 days.

(21) Appl. No.: 15/686,545

(22) Filed: Aug. 25, 2017

(65) Prior Publication Data

US 2017/0349089 A1    Dec. 7, 2017

Related U.S. Application Data

(62) Division of application No. 14/995,876, filed on Jan. 14, 2016, now Pat. No. 9,771,018.

(Continued)

(51) Int. Cl.
*B60Q 1/00* (2006.01)
*B60Q 1/26* (2006.01)
(Continued)

(52) U.S. Cl.
CPC .............. *B60Q 1/26* (2013.01); *B60R 25/25* (2013.01); *G06Q 50/30* (2013.01); *G07C 5/008* (2013.01); *G07C 2205/02* (2013.01)

(58) Field of Classification Search
CPC .................................................. G01N 27/223
(Continued)

(56) References Cited

U.S. PATENT DOCUMENTS 6,356,838 B1   3/2002 Paul
8,428,814 B2   4/2013 Tripathi et al.
(Continued)

FOREIGN PATENT DOCUMENTS

WO    2014036333 A1    3/2014

OTHER PUBLICATIONS

International Search Report and Written Opinion of the International Searching Authority from corresponding Patent Cooperation Treaty (PCT) Application No. PCT/IB2016/057277, dated Jan. 30, 2017.

*Primary Examiner* — Ojiako Nwugo
(74) *Attorney, Agent, or Firm* — Gardner, Linn, Burkhart & Flory, LLP

(57) ABSTRACT

The transport authentication system and method includes an electronic vehicle identification device configured to connect to a vehicle that is registered for on-call or scheduled transportation use with a service provider organization ("SPO") to obtain vehicle identification information from the vehicle, such as by being connected to the OBD port of the vehicle. The obtained vehicle identification information is transmitted to a SPO for comparison with identification authentication information retained by the SPO. A notice may then be transmitted to a potential passenger or package owner to notify the individual that the vehicle is an authentic, authorized vehicle for transport service. Driver identification information may additionally be obtained for comparison to driver identification authentication information retained by the SPO. Notification may thus also be transmitted to the potential passenger or package owner that the driver is the authorized, registered driver.

18 Claims, 1 Drawing Sheet

Related U.S. Application Data

(60) Provisional application No. 62/270,378, filed on Dec. 21, 2015, provisional application No. 62/262,733, filed on Dec. 3, 2015.

(51) Int. Cl.
  *G07C 5/00* (2006.01)
  *B60R 25/25* (2013.01)
  *G06Q 50/30* (2012.01)

(58) Field of Classification Search
  USPC .............................................. 340/425.5, 901
  See application file for complete search history.

(56) References Cited

U.S. PATENT DOCUMENTS

| | | | |
|---|---|---|---|
| 2003/0050744 A1* | 3/2003 | Saraiva | G08G 1/0962 701/1 |
| 2008/0015748 A1 | 1/2008 | Nagy | |
| 2009/0042518 A1* | 2/2009 | Ido | B60R 25/2018 455/90.2 |
| 2013/0099940 A1 | 4/2013 | Protopapas | |
| 2013/0132140 A1 | 5/2013 | Amin et al. | |
| 2013/0132246 A1 | 5/2013 | Amin et al. | |
| 2013/0132887 A1 | 5/2013 | Amin et al. | |
| 2013/0246207 A1 | 9/2013 | Novak et al. | |
| 2013/0246301 A1 | 9/2013 | Radhakrishman et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0139359 A1* | 5/2014 | Paul | G08G 1/141 340/932.2 |
| 2014/0167946 A1 | 6/2014 | Armitage | |
| 2014/0195100 A1 | 7/2014 | Lundsgaard et al. | |
| 2014/0207629 A1 | 7/2014 | Bradley et al. | |
| 2014/0226010 A1 | 8/2014 | Molin | |
| 2015/0112545 A1 | 4/2015 | Binion et al. | |
| 2015/0166009 A1* | 6/2015 | Outwater | B60R 25/04 701/2 |
| 2015/0187019 A1* | 7/2015 | Fernandes | G06Q 40/08 705/4 |
| 2015/0271290 A1 | 9/2015 | Tao et al. | |
| 2015/0348221 A1 | 12/2015 | Pedersen et al. | |
| 2016/0027079 A1* | 1/2016 | Schoeffler | G06Q 30/0609 705/325 |
| 2016/0171574 A1* | 6/2016 | Paulucci | G07B 15/02 705/13 |
| 2016/0219059 A1* | 7/2016 | Park | G06F 21/30 |
| 2016/0300412 A1* | 10/2016 | Ko | G07C 9/00309 |
| 2017/0186248 A1 | 6/2017 | Fournier | |

* cited by examiner

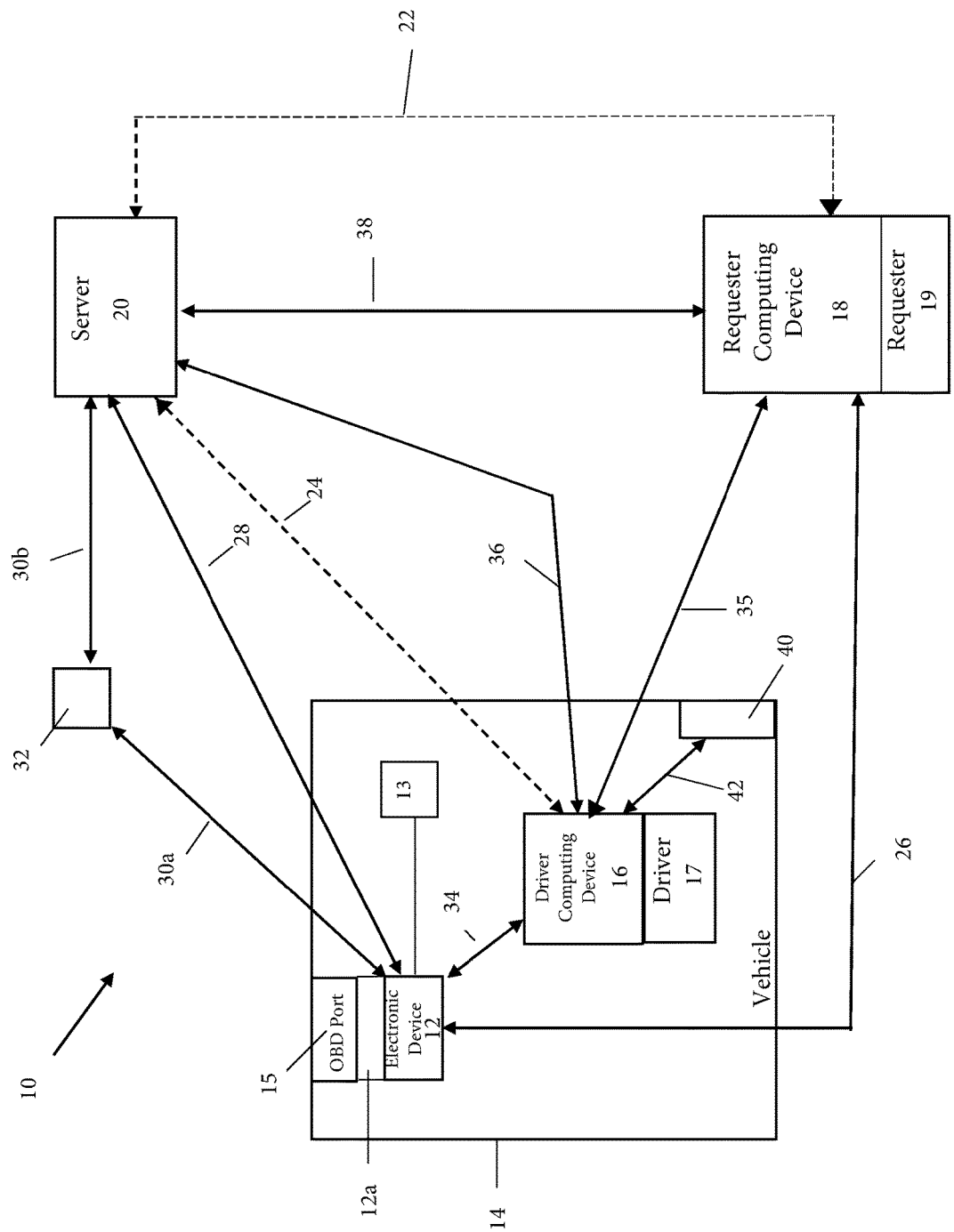

SYSTEM AND METHOD FOR IDENTIFICATION OF TRANSPORT VEHICLES AND DRIVERS

CROSS REFERENCE TO RELATED APPLICATIONS

The present application is a divisional of U.S. application Ser. No. 14/995,876, filed Jan. 14, 2016, which claims priority of U.S. provisional application Ser. No. 62/262,733 filed Dec. 3, 2015 and claims priority of U.S. provisional application Ser. No. 62/270,378 filed Dec. 21, 2015.

BACKGROUND OF THE INVENTION

The present invention is directed to a system and method for identifying transport vehicles and their drivers, and is directed for use in connection with enabling passengers and/or persons requesting transport of materials and/or transportation service providers and/or vehicle fleet managers the ability to confirm the authenticity of vehicles and/or drivers with whom they engage or manage, such as prior to passengers entering the vehicle or transport material owners or owner representatives releasing materials for delivery to a driver.

The "rideshare" business has been expanding, which business involves private individuals or agents that own vehicles serving as on-call transportation service providers that are linked to potential passengers or persons requesting delivery of packages via service provider organizations ("SPOs"). Examples of ride share entities that the term SPO term is meant to refer to include but are not limited to UBER, LYFT and SIDECAR. The potential passengers/package owners are linked to the SPOs and drivers using GPS-enabled mobile computing devices, such as phones or tablets employing specific software. Some existing ride share entities provide a display to a passenger/package owner of the driver's photo, a description of the driver's vehicle, and/or the vehicle's license plate whereby the passenger/package owner is provided with information that may enable the passenger/package owner to visually confirm the identity of the vehicle and/or driver. Still further, some existing ride share entities employ a color selectable vehicle light to visually indicate to a ride requester that a vehicle appearing before them is the vehicle they have scheduled.

SUMMARY OF THE INVENTION

The present invention provides a system and method for automatically identifying transport vehicles and their drivers to thereby provide passengers and/or persons requesting transport of materials confirmation of the authenticity of vehicles and/or drivers with whom they engage as well as confirmation that they are entering the particular authenticated vehicle that has been scheduled for them. The system and method of the present invention has applicability to rideshare and package transport businesses, as well as to other vehicle transportation industries, including for example, vehicle rental businesses, traditional taxi services, and vehicle fleet management businesses.

According to an aspect of the present invention, a transport authentication system comprises an electronic vehicle identification device configured to connect to an On Board Diagnostic ("OBD") port of a vehicle registered for on-call or scheduled transportation use through an SPO, with the device configured to obtain vehicle identification information from the vehicle. The electronic vehicle identification device is additionally configured to transmit the obtained vehicle identification information to a computing device, such as an SPO server. The vehicle identity is registered with the SPO such that the system is configured to compare the vehicle identification information obtained and transmitted by the electronic vehicle identification device with the vehicle identity registered with the SPO to confirm the identity of the vehicle.

In a particular embodiment, the electronic vehicle identification device obtains the vehicle's vehicle identification number ("VIN"). Alternatively or additionally, the obtained vehicle identification information comprises vehicle system identification information. Still further, a biometric identification device may be employed to obtain driver identification information, with the system configured to transmit the driver identification information to a computing device, such as a computing device of an SPO. The biometric identification device may be operatively connected to the electronic vehicle identification. Alternatively, a mobile computing device of a passenger/package owner may operate as the biometric identification device via integrated systems of the mobile computing device.

According to another aspect of the present invention, a method of authenticating transport information comprise providing an electronic vehicle identification device configured to obtain vehicle identification information from a vehicle, and operatively connecting the device to a vehicle to obtain vehicle identification information, such as by connecting the device to an OBD port of the vehicle. The method further includes comparing the vehicle identification information to registered vehicle identity information that is registered with a SPO, and transmitting a notice to a computing device of an individual requesting transport service to notify the individual as to whether the vehicle matches the registered vehicle.

In a particular embodiment, the method includes transmitting the obtained vehicle identification information to a computing device of a SPO for comparing the information, and transmitting the notice to the individual from the computing device of the service provider. The method may further include obtaining driver identification information, comparing the driver identification information to driver identity information that is recorded or registered with a SPO, and transmitting a notice to the computing device of the individual requesting transport service to notify the individual as to whether the driver matches the recorded or registered driver identity information.

It should thus be understood that the system and method of the present invention makes a determination as to whether the connected vehicle presented to a passenger or package owner is the correct vehicle and informs the passenger or package owner via their mobile computing device whether or not the vehicle presented for service is the authentic vehicle authorized and registered with the SPO. This determination and communication can be made prior to the passenger climbing into the vehicle and/or prior to the package owner surrendering the package. In this way, safety is enhanced since a passenger can enter the vehicle or a package owner can release a package to a driver with confidence that the vehicle is the authorized and registered vehicle that was engaged through and screened by the SPO via an established set of criteria. Still further, the system and method forwards vehicle identity information in near real time, including to the authenticating SPO to ensure that the driver is presenting for service to the public only the particular vehicle that the SPO has screened and authorized. In this way the SPO can protect its reputation and legal liability by remotely preventing drivers from participating in its ride share system if they utilize unauthorized vehicles.

The system and method of the present invention may additionally operate to establish and authenticate the identity of the driver, such as via a biometric identification device or by a driver profile. A signal or signals transmitted to the computing device, such as a smartphone, of the passenger or package owner, result in a display on the computing device advising of whether or not the driver is the screened, authentic driver registered with the SPO for the vehicle. Accordingly, the passenger and/or package owner can engage in the transportation service with confidence that the driver and/or the vehicle and/or the combination of vehicle and driver are those that the SPO has authorized to provide service and those that were actually engaged during the initial service scheduling event. The ability of the system to transmit driver and vehicle identification information in near real time enables the SPO to monitor in service driver-vehicle combinations to ensure that only prescreened, preauthorized drivers are providing service on behalf of the SPO, and that those prescreened, preauthorized drivers are providing that service with vehicles that have also been prescreened and preauthorized by the SPO.

These and other objects, advantages, purposes and features of this invention will become apparent upon review of the following specification in conjunction with the drawing.

BRIEF DESCRIPTION OF THE DRAWINGS

The drawing FIGURE is a schematic illustration of a vehicle and driver identification system in accordance with an aspect of the present invention disclosing a vehicle equipped with an electronic device, along with a requester computing device, driver computing device, and SPO computing device.

DESCRIPTION OF THE PREFERRED EMBODIMENTS

The present invention will now be described with reference to the accompanying FIGURE, wherein the numbered elements in the following written description correspond to like-numbered elements in the FIGURE. A transport vehicle and driver identification system in accordance with an embodiment of the present invention is schematically illustrated at 10 in the drawing FIGURE. As there shown, an electronic vehicle identification device 12 is operatively connected to vehicle 14, where in the illustrated embodiment device 12 includes an On Board Diagnostics ("OBD") connector 12a to connect to an OBD port 15 of vehicle 14. Device 12 operates to interrogate the computer system of vehicle 14 to obtain identifying information of vehicle 14 to establish its identity. The vehicle identification information may then be transmitted by device 12 to various computing devices, such as smartphones or tablets, which are illustrated as a driver computing device 16 and a passenger/package owner computing device 18. Still further, the vehicle identification information may be transmitted to a service provider organization ("SPO"), such as to an SPO computing device, such as server 20. As discussed in more detail below, a passenger/package owner is thus able to receive notification on computing device 18 that vehicle 14 is the authorized vehicle for transport.

In practice, a potential passenger or individual desiring a package to be transported, herein referred to as a requester and represented at 19, will initiate transport by contacting a SPO via a passenger/package owner computing device 18, herein referred to as a requester computing device 18. In particular, the requester may employ a GPS enabled computing device 18 to transmit a request to SPO server 20, with this transmitted request being illustrated by signal 22 in the drawing FIGURE. SPO will subsequently send a communication to a GPS enabled driver computing device 16 of a driver 17 to coordinate/authorize the driver to engage in the transport requested by the requester 19, that is as a passenger or to transport material, with this communication illustrated by signal 24 from SPO server 20 to driver computing device 16. The driver 17 will have been pre-authorized with the SPO to contract for such transportation, including having the driver's vehicle 14 registered with the SPO, such as to confirm that it is qualified and/or appropriate for use in transporting passengers and/or packages.

It should be understood that the SPO term is used herein as a label of convenience to refer to organizations or individuals who could make use of the present invention notwithstanding whether those organizations or individuals qualify in law or practice as transportation service providers. Accordingly, as used herein in the context of the present invention, the SPO term is also meant to apply to vehicle fleet managers in general who may have need to positively identify and/or manage vehicles and/or drivers during the conduct of their business according to internal or external standards and policies. Those fleet managers may or may not qualify as ride share entities. The term SPO is thus not limited to ride share entities, such as the exemplary noted UBER, LYFT and SIDECAR.

In accordance with an aspect of the present invention, electronic vehicle identification device 12 is operatively connected to vehicle 14 through the OBD port of vehicle 14, with electronic device 12 including both hardware and software. Device 12 operates to interrogate vehicle 14 to obtain identification information of vehicle 14. For example, for model year 2004 and newer vehicles, the vehicle manufacturer is required by regulations to embed the vehicle identification number ("VIN") in the software of the vehicle's electronic control modules such that the VIN is readily retrievable by electronic device 12 through the OBD port of vehicle 14.

Similarly, or alternatively for older model vehicles such as pre-2004 model year vehicles, electronic device 14 may interrogate vehicle 14 through the OBD port of the vehicle 14 to obtain alternative identification information comprising vehicle system identification information. This vehicle system identification information may include, for example, the communication protocol employed by the vehicle 14, the presence of certain components and/or subsystems and/or electronic control schemes, as well as other vehicle identifying parameters, such as On Board Diagnostic Parameter Identification ("PID") counts, Calibration Identification ("CAL-ID") data, and/or Powertrain Control Module ("PCM") data, or the like. Such alternative information relative to a vehicle VIN may be used to either establish the identity of the vehicle and/or identify the vehicle to a specific, narrow range of vehicle make and model.

Upon establishing the identification information of vehicle 14, device 12 further operates to communicate the identification information to one or more computer devices. This may include, for example, transmitting the identification information to the SPO server 20, requester computing device 18 and/or driver computing device 16. Additionally or alternatively, upon device 12 communicating identification information to driver computing device 16, device 16 may re-transmit the identification information to the SPO server 20. These various information transmissions are illustrated in the drawing FIGURE, with the transmission from electronic device 12 to requester computing device 18 illustrated as signal 26, and the transmission from electronic device 12 to SPO server 20 illustrated as signal 28. Alternatively, electronic device 12 may transmit a signal 30a to a transmission tower 32, with tower 32 in turn transmitting the signal 30b to SPO server 20. In such an embodiment, tower 32 may comprise a cellular tower or base station. Still further, the transmission from electronic device 12 to driver computing device 16 is illustrated as signal 34, with the subsequent transmission of the identification information from driver computing device 16 to SPO server 20 illustrated as signal 36. In a further alternative embodiment, driver computing device 16 may also operate to re-transmit identification information to the requester computing device 18, such as illustrated by signal 35.

It should be appreciated that various means of signal transmission may be employed within the scope of the present invention. This may include, for example, Blue Tooth, or a wireless local area network ("WLAN") or Wi-Fi, or other such communication protocols or transmission systems, including combinations thereof. For example, Blue Tooth may be used to communicate from electronic device 12 to the driver computing device 16, with the driver computing device 16 in turn communicating to SPO server 20 via Wi-Fi. It should also be appreciated that the various computing devices discussed above employ application software for communicating and processing the various signals in accordance with the present invention.

Upon receiving the identification information, the SPO server 20, via the program software, may compare the identity information to the authorized vehicle identity associated with the driver, and which was established through the SPO when the services was initially scheduled with the requester 19. By the comparison the SPO server 20 determines whether or not the vehicle 14 to which electronic device 12 is connected is the correct, authentic and authorized vehicle 14 for the transportation service. The SPO server 20 can thereby transmit various signals, including for example signal 38 to requester computing device 18 whereby a display is provided to the requester 19 such that the requester 19 receives confirmation of the authenticity of the vehicle 14 being presented for service, or a display that the vehicle 14 presented to the requester is not the authentic vehicle registered with the SPO. This displayed confirmation or denial may be provided prior to the requester 19 entering the vehicle as a passenger or prior to a package for transport being released by the requester 19 to the driver 17.

It should be appreciated that various methodologies for confirmation may be employed within the scope of the present invention. For example, signal 38 may be a confirmation signal to requester. Alternatively, signal 38 may be a signal transmitting identification information to requester computing device 18, with requester computing device 18 additionally receiving identification information via signal 26 from electronic device 12. Requester computing device 18 may then perform a comparison to confirm the authenticity of vehicle 14. In such an embodiment, for example, the signal 38 may comprise the registered vehicle identification information obtained by the SPO when the driver registered vehicle 14 with the SPO.

Still further, the provision of GPS enabled computing devices 16 and 18 may be employed in connection with the identification process. For example, SPO server 20 may monitor the geographic location and confirm the proximity of devices 16 and 18, with that proximity along with the receipt of signals 26 and/or 34 being used to present the requester 19 confirmation of the authenticity of the vehicle 14 being presented to the requester 19 at the requester's geographical position.

It should further be appreciated that the determination and transmission of vehicle identity information and authentication may occur in near real time, whereby the SPO is able to monitor and ensure that the driver 17 is presenting to the public only the particular vehicle 14 that the SPO has screened and authorized. In the event a driver 17 does not comply with the SPO vehicle authorization requirements, the SPO may remotely electronically preclude the driver 17 from participation in the SPO ride share scheduling system. Moreover, as an initial matter, the SPO may monitor for the presence of the installation of an electronic device 12 in a vehicle 14 as a prerequisite to providing the transport opportunity to the driver 17 in the first instance.

System 10 may additionally operate to establish and authenticate the identity of the driver 17, such as via inclusion of a biometric identification device, such as a biometric identification device 13 integrated with electronic device 12. Biometric identification device 13 may comprise any of a number of identification devices, such as known biometric identification devices including, but not limited to, fingerprint scanning, voice recognition, facial recognition, and/or iris scanning via known technologies. For example, in one embodiment biometric identification device 13 may comprise an electronic fingerprint scanner operatively integrated or connected to OBD electronic device 12. Driver 17 may be prompted/required to scan his or her finger on biometric identification device 13 prior to or as part of the confirmation signal provided to requester 19. Alternatively, a biometric identification device may be integrated into or utilized from the driver computing device 16 of driver 17, such as a smartphone or tablet that may already include a fingerprint scanner. Still further, a biometric identification device may be integrated into or utilized from the requester computing device 18 of requester 19, which for example may already include a fingerprint scanner. In such an embodiment, the requester 19 could present his or her computing device 18 to the driver 17 for authentication of the driver's identity.

One or more biometric identification devices may be employed, for example, with the software on the computing device of the driver 17 and/or requester 19 prompting or requesting that the driver 17 present his or her finger on the scanning device for verification that the authorized driver is present with the authorized vehicle, such as at or about the time and place the arranged service commences. This may be, for example, based on customer preferences, such as prior to requester 19 entering the vehicle or releasing material to be delivered to the driver 17. Upon the finger of the driver 17 being scanned, or other such biometric identity information being obtained, the software of the system will compare the biometric identity information to the biometric data associated with the driver 17 that has been previously obtained by the SPO when the driver 17 registered with the SPO to thereby establish whether the driver 17 is the screened, authentic driver associated with the specific vehicle 14. Similar to the authentication of vehicle 14, the driver 17 authentication information is then transmitted to the requester computing device 18 and displayed to requester 19 to inform the requester 19 as to whether or not the presented driver 17 is the screened, authentic driver registered with the SPO for the vehicle 14.

It should be appreciated that system 10 may transmit and process driver identification information in similar manner to the transmission of vehicle identification information discussed above, including via electronic device 12, computing devices 16 and 18, and SPO server 20, and such as via signals 26, 28, 30a and 30b, and 34, as also discussed above.

Alternatively or additionally to employing a biometric identification device 13, system 10 may establish and authenticate the identity of driver 17 by a driver profile, such as may be monitored by electronic device 12. For example, a driver profile of the driving habits or specifics of driver 17 may be established detected through the use of OBD, GPS, accelerometer, or other sensor data. Sensor data identification may include, for example, evaluating the position of the seat, evaluating the position of adjustable brake and gas pedals, evaluating the position of the steering wheel, and/or evaluating the weight of the driver as detected by the vehicle's onboard system. Still further, driver profile data may include or be established by an expected profile for accelerator pedal position and brake pedal usage versus speed and load as compared to actual driver accelerator and brake pedal input as monitored by the electronic device 12. Electronic device 12 may then itself perform an identification analysis and transmit a confirmation signal that the expected, profiled driving conditions/settings match the actual driving conditions/settings. Such a comparison may be performed, for example, while vehicle 14 is being driven to the location of requester 17.

According to a still further aspect of the invention, an electronic display or sign 40 is provided on vehicle 14 that is configured to be outwardly facing so as to be visible to requester 19 when requester 19 is located outside of the vehicle 14, where sign 40 may be located on an interior or exterior of vehicle 14. In such an embodiment, upon requester 19 initially requesting a transport service via transmission of a request to server 20 using computing device 18, requester 19 would additionally be required to select a code in the form of a word and/or number and/or graphical symbol. As discussed in more detail below, upon verification that the vehicle 14 and driver 17 are authenticated as the authorized vehicle 14 and driver 17, the preselected code would be displayed on electronic sign 40 to provide requester 19 with visual confirmation thereof.

Requester 19 may select a code, with the code being generated and exchanged between computing device 18 and server 20, such as via signals 22. For example, the associated software on computing device 18 and server 20 may prompt requester 19 to select a code from a scrollable listing of codes presented on computing device 18, or alternatively requester 19 may be prompted to enter a code via computing device 18, such as an alphanumeric code representing words, numbers or a combination thereof that would be familiar to or recognized by the requester 19. The selected or entered code is then transmitted to or recorded by server 20.

In a particular form of the embodiment, server 20 in turn transmits the code to the computing device 16 of driver 17. As discussed above, vehicle 14 and driver 17 are confirmed via interrogation of vehicle 14 by electronic device 12 to confirm that vehicle 14 corresponds to the authorized vehicle, as well as upon verification of driver 17, such as by driver 17 being prompted to place his or her finger on a fingerprint scanner for identification. Upon verification of both vehicle 14 and driver 17 as being the pre-registered authorized combination of driver and vehicle, the software application on the driver computing device 16 wirelessly transmits the pre-selected code to electronic sign 40, such as via signal 42 for the requester 19, as a prospective passenger, to see. The passenger/requester 19 is thus provided with a visual notification of the confirmation that the vehicle 14 and driver 17 combination being presented is the authorized vehicle 14 and driver 17 what was scheduled through the SPO system, with that vehicle 14 and driver 17 having been pre-screened by the SPO.

In alternative embodiments, the code displayed by electronic display 40 may be transmitted by alternative computing devices other than the computing device 16 of the driver 17. For example, server 20 may transmit the code directly to electronic display 40 upon receiving a signal 28 from electronic device 12 alerting to the authentication of the identity of the vehicle 14 and driver 17. Still further, server 20 may transmit the code to electronic device 12, with electronic device 12 in turn transmitting the code to electronic display 40 upon electronic device 20 confirming the authenticity of the vehicle 14, as well as upon verification of the identity of the driver 17. It should be appreciated that still further alternatives may be employed.

It should be understood that the driver identification and authentication information may be determined and transmitted in near real time, including to the SPO. Accordingly, the SPO is able to monitor in service driver and vehicle combinations to ensure that only prescreened, preauthorized drivers are providing service in association with the SPO, and that those drivers are only providing service using vehicles that have been prescreened and preauthorized for service by the SPO. The data may also be tracked by the SPO and recorded in a database, such as a database of SPO server 20, for administrative purposes such as tracking driver and vehicle service activities, as well as monitoring and recording in service and out-of-service times, such as for purposes of complaint and/or accident investigation. Vehicle and/or driver identification information may additionally be used by the SPO to manage the conduct of their business according to internal or external standards and policies.

Although the illustrated embodiment is generally discussed in connection with rideshare and transportation service businesses, it should be appreciated that the present invention is applicable for use in connection with other vehicle transportation business as well. This includes, for example, traditional taxi services and vehicle rental business. In which case the alternative vehicle transportation businesses would operate as SPOs in accordance with the present invention. In the vehicle rental business, for example, the present invention may be used to enable a vehicle rental customer to confirm that a vehicle being delivered for rental use is the pre-requested and authorized vehicle being provided by an authorized employee. Still further, the present invention may be employed in connection with various service entities that provide transportation for customers, such as vehicle repair facilities that provide transportation when a vehicle is being repaired and the service facility provides a customer a ride to the repair facility, such as from the customer's place of employment, their home or other location.

It should also be appreciated that the driver's computing device 16 may be a smartphone, tablet, laptop computer, or other such portable computing device. Similarly, the requester's computing device 18 may be a smartphone, tablet, portable or desktop computer, or other such device. It should further be appreciated that the SPO computing device, which in the illustrated embodiment is shown as SPO server 20, may comprise one or more computing devices, as well as computing devices other than servers. Changes and modifications in the specifically described embodiments can be carried out without departing from the principles of the present invention which is intended to be limited only by the scope of the appended claims, as The embodiments of the invention in which an exclusive property or privilege is claimed are defined as follows:

1. A transport authentication system, said system comprising: an electronic vehicle identification device configured to connect to a vehicle registered for on-call transportation use with a service provider organization ("SPO") with the vehicle identity registered with the SPO, said electronic vehicle identification device configured to obtain vehicle identification information from the vehicle;

said electronic vehicle identification device configured to transmit the obtained vehicle identification information to a computing device of the SPO;

wherein said computing device of the SPO is configured to compare the vehicle identification information obtained and transmitted by said electronic vehicle identification device with the vehicle identity registered with the SPO to confirm the identity of the vehicle.

2. The system of claim 1, wherein said electronic vehicle identification device includes an onboard diagnostic ("OBD") connector and is configured to connect to an OBD port of the vehicle.

3. The system of claim 1, wherein the obtained vehicle identification information comprises at least one of the vehicle identification number and vehicle system identification information.

4. The system of claim 1, further including a biometric identification device, said biometric identification device configured to obtain driver identification information with said system configured to transmit said driver identification information to the computing device.

5. The system of claim 4, wherein said biometric identification device comprises a fingerprint scanner, a voice recognition device, a facial recognition system, or an iris scanner, and wherein said biometric identification device is integrated with a computing device of a transport requester or a driver.

6. The system of claim 1, wherein said electronic vehicle identification device is configured to transmit the obtained vehicle identification information to the computing device of the SPO via an intermediary computing device, and wherein the intermediary computing device comprises at least one of (i) a computing device of a transportation service requester, and (ii) a computing device of a driver of the vehicle.

7. The system of claim 6, wherein the computing device of the SPO comprises a server, the computing device of the transportation service requester comprises a mobile computing device, and the computing device of the driver comprises a mobile computing device.

8. The system of claim 1, further including an electronic sign configured to mount to the vehicle registered for on-call transportation use with a SPO, said electronic sign configured to display a code transmitted by a computing device of said SPO.

9. A method of authenticating transport information, said method comprising: providing an electronic vehicle identification device configured to obtain vehicle identification information from a vehicle when said electronic vehicle identification device is operatively connected to the vehicle;

obtaining vehicle identification information from the vehicle using the electronic vehicle identification device;

transmitting the vehicle identification information to a computing device of a service provider organization ("SPO");

comparing the vehicle identification information to registered vehicle identity information that is registered with the SPO at the computing device of the SPO;

generating a code selected by an individual requesting transport service via a computing device of the individual;

transmitting the code to an electronic sign mounted to the vehicle to generate a visual display to the individual upon confirming that the vehicle identification information matches the registered vehicle information that is registered with the SPO.

10. The method of claim 9, wherein the step of transmitting the code to an electronic sign comprises transmitting the code to an electronic sign upon confirming both that the vehicle identification information matches the registered vehicle information that is registered with the service provider and that the vehicle identification information matches that of the vehicle scheduled for service for the individual requesting transport service.

11. The method of claim 10, wherein said generating a code comprises selecting a code from a plurality of available codes or entering a code by the individual.

12. The method of claim 9, further comprising transmitting a notice to a computing device of an individual requesting transport service to notify the individual as to whether the vehicle matches the registered vehicle.

13. The method of claim 9, further comprising obtaining driver identification information, comparing the driver identification information to driver identity information that is recorded or registered with a SPO, and transmitting a notice as to whether the driver matches the recorded or registered driver identity information.

14. The method of claim 13, wherein said transmitting a notice as to whether the driver matches the recorded or registered driver identity information comprises providing a signal to said electronic sign to display the code.

15. The method of claim 13, wherein said obtaining driver identification information comprises obtaining driver identification information with a biometric identification device, and wherein said biometric identification device is integrated with a computing device.

16. A method of authenticating transport information, said method comprising:

receiving a request for transport service at a computing device of a service provider organization ("SPO") from a computing device of a transportation service requester;

providing an electronic vehicle identification device configured to obtain vehicle identification information from a vehicle when said electronic vehicle identification device is operatively connected to the vehicle;

obtaining vehicle identification information from the vehicle using the electronic vehicle identification device;

transmitting the vehicle identification information to the computing device of the transportation service requester;

transmitting registered vehicle identity information registered with the SPO from the computing device of the SPO to the computing device of the transportation service requester;

comparing at the computing device of the transportation service requester the vehicle identification information received from the vehicle identification device to the registered vehicle identity information received from the computing device of the SPO;

generating a confirmation signal on the computing device of the transportation service requester confirming the identity of the vehicle if the vehicle identification information obtained and transmitted by the electronic vehicle identification device matches the registered vehicle identity information registered with the SPO.

17. The method of claim 16, further comprising obtaining driver identification information, and comparing the driver identification information to driver identity information that is recorded or registered with the SPO.

18. The method of claim 17, wherein said obtaining driver identification information comprises obtaining driver identification information with a biometric identification device.

\* \* \* \* \*

UNITED STATES PATENT AND TRADEMARK OFFICE
CERTIFICATE OF CORRECTION

| | |
|---|---|
| PATENT NO. | : 9,902,310 B2 |
| APPLICATION NO. | : 15/686545 |
| DATED | : February 27, 2018 |
| INVENTOR(S) | : Thomas J. Fournier, Lothar Geilen and Brian J. Herron |

It is certified that error appears in the above-identified patent and that said Letters Patent is hereby corrected as shown below:

On the Title Page

Delete Title Page and Replace with attached Title Page

In the Claims

Column 11
Line 16, insert:
--19. The system of claim 1, wherein the computing device of the SPO is configured to send a signal to a computing device of a transportation service requester confirming the identity of the vehicle if the vehicle identification information obtained and transmitted by said electronic vehicle identification device matches the vehicle identity registered with the SPO.--

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*

(12) United States Patent
Fournier et al.

(10) Patent No.: US 9,902,310 B2
(45) Date of Patent: Feb. 27, 2018

(54) SYSTEM AND METHOD FOR IDENTIFICATION OF TRANSPORT VEHICLES AND DRIVERS

(71) Applicant: Opus Inspection, Inc., East Granby, CT (US)

(72) Inventors: Thomas J. Fournier, Tucson, AZ (US); Lothar Geilen, Key Biscayne, FL (US); Brian J. Herron, Dexter, MI (US)

(73) Assignee: Opus Inspection, Inc., East Granby, CT (US)

(*) Notice: Subject to any disclaimer, the term of this patent is extended or adjusted under 35 U.S.C. 154(b) by 0 days.

(21) Appl. No.: 15/686,545

(22) Filed: Aug. 25, 2017

(65) Prior Publication Data
US 2017/0349089 A1    Dec. 7, 2017

Related U.S. Application Data

(62) Division of application No. 14/995,876, filed on Jan. 14, 2016, now Pat. No. 9,771,018.
(Continued)

(51) Int. Cl.
*B60Q 1/00*    (2006.01)
*B60Q 1/26*    (2006.01)
(Continued)

(52) U.S. Cl.
CPC .............. *B60Q 1/26* (2013.01); *B60R 25/25* (2013.01); *G06Q 50/30* (2013.01); *G07C 5/008* (2013.01); *G07C 2205/02* (2013.01)

(58) Field of Classification Search
CPC .................................................. G01N 27/223
(Continued)

(56) References Cited

U.S. PATENT DOCUMENTS 6,356,838 B1   3/2002 Paul
8,428,814 B2   4/2013 Tripathi et al.
(Continued)

FOREIGN PATENT DOCUMENTS

WO   2014036333 A1   3/2014

OTHER PUBLICATIONS

International Search Report and Written Opinion of the International Searching Authority from corresponding Patent Cooperation Treaty (PCT) Application No. PCT/IB2016/057277, dated Jan. 30, 2017.

*Primary Examiner* — Ojiako Nwugo
(74) *Attorney, Agent, or Firm* — Gardner, Linn, Burkhart & Flory, LLP

(57) ABSTRACT

The transport authentication system and method includes an electronic vehicle identification device configured to connect to a vehicle that is registered for on-call or scheduled transportation use with a service provider organization ("SPO") to obtain vehicle identification information from the vehicle, such as by being connected to the OBD port of the vehicle. The obtained vehicle identification information is transmitted to a SPO for comparison with identification authentication information retained by the SPO. A notice may then be transmitted to a potential passenger or package owner to notify the individual that the vehicle is an authentic, authorized vehicle for transport service. Driver identification information may additionally be obtained for comparison to driver identification authentication information retained by the SPO. Notification may thus also be transmitted to the potential passenger or package owner that the driver is the authorized, registered driver.

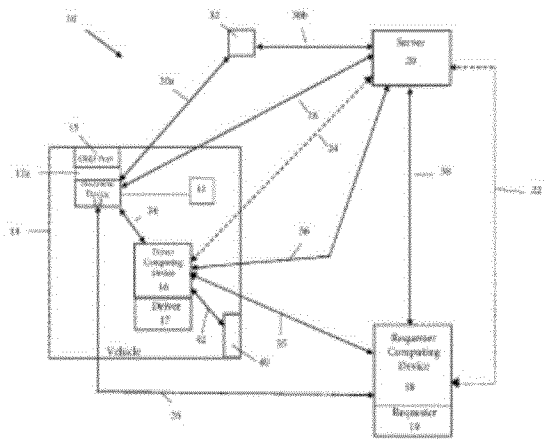

19 Claims, 1 Drawing Sheet